United States Patent [19]

Harada et al.

[11] Patent Number: 5,682,557

[45] Date of Patent: Oct. 28, 1997

[54] CAMERA WITH A REMOTE CONTROL UNIT

[75] Inventors: Satoshi Harada; Kosei Miyauchi, both of Hachioji, Japan

[73] Assignee: Konica Corporation, Japan

[21] Appl. No.: 577,868

[22] Filed: Dec. 22, 1995

[30] Foreign Application Priority Data

Jan. 11, 1995 [JP] Japan ................... 7-002635

[51] Int. Cl.⁶ .................................................. G03B 17/00
[52] U.S. Cl. .................................................. 396/59
[58] Field of Search ........................... 354/266; 396/56, 396/59; 348/211

[56] References Cited

U.S. PATENT DOCUMENTS

| | | | |
|---|---|---|---|
| 4,998,125 | 3/1991 | Watanabe et al. | 354/403 |
| 5,093,679 | 3/1992 | Taniguchi et al. | 354/400 |
| 5,323,203 | 6/1994 | Maruyama et al. | 354/410 |
| 5,430,518 | 7/1995 | Tabata et al. | 354/267.1 |
| 5,446,512 | 8/1995 | Mogamiya | 354/131 |
| 5,463,436 | 10/1995 | Shintani et al. | 354/81 |
| 5,491,529 | 2/1996 | Iwai et al. | 354/266 |
| 5,528,337 | 6/1996 | Kawano | 354/266 |

*Primary Examiner*—Safet Metjahic
*Assistant Examiner*—John Chizmar
*Attorney, Agent, or Firm*—Jordan B. Bierman; Bierman, Muserlian and Lucas LLP

[57] ABSTRACT

A camera includes: a switching circuit for switching the camera between a suspending status and a photographable status; a remote control unit which includes an operation member for conducting a photographing operation and a transmitter for outputting a photographing signal when the operation member is operated; a receiver for receiving the photographing signal; and a control circuit for controlling the camera so that a photographing operation is always conducted in accordance with a receipt of the photographing signal with the receiver when the switching circuit is switched to the photographable status. In order to conserve battery voltage, the control circuit sends a signal to the receiver to turn the receiver off after a set period of time has lapsed and no photographing signal has been received from the control unit.

9 Claims, 8 Drawing Sheets

CAMERA WITH A REMOTE CONTROL UNIT

BACKGROUND OF THE INVENTION

This invention is related to a camera which is capable of being remote controlled with a remote control unit.

In a conventional camera with a remote control unit, the consuming current of the receiver circuit, which receives the photographing signal from the remote control unit, is large; therefore, the battery as a power source is consumed remarkably quickly when the receiver circuit remains operating all the time. Therefore, after the main switch is turned on or a photographing stand-by operation, such as flash light charging etc., is completed, the camera is set to a remote control mode in which the receiver circuit is set to the operable condition to receive a photographing signal by a manual operation. After this, an operator operates the remote control unit so as to transmit the photographing signal toward the camera from the position apart from the camera. The photographing operations including shutter-releasing and zooming operations are executed through the remote control.

Further, there is a camera in which a remote control unit is configured to be capable of being removed from the main body of the camera so that a remote control mode is automatically set when the remote control unit is removed from the main body of the camera.

Further, there is a remote control unit which is capable of being attached to a strap for suspending a camera.

In the above explained conventional technologies, there are disclosures of the configurations wherein a remote control mode is canceled a predetermined period of time after the remote control mode is set and that a receivable angle of the signals from the remote control unit is set wider than an angle of view of the camera so that the camera is capable of receiving the signals from outside the angle of view.

However, in the conventional cameras being provided with a remote control unit, then are the following problems:

It is always required to operate a switch of a remote control unit to set the camera into the remote control mode when the remote control unit is used; therefore, the operation is complicated and the remote control unit can not be operable if the remote control mode is not set. In that case, an operator can be confused and required to set the camera again.

Further, if the camera is configured so that various photographing modes and the remote control mode are operated with one switch, the number of modes is multiplied so that an operator is easily confused because an indication of the remote control mode is included in the usual photographing modes.

Further, if an exclusive switch for the remote control mode is provided with a camera, an extra switch is added to the camera and it becomes a hindrance to minimize the size of the camera.

Further, in the above two conventional methods, a display portion, for indicating a selection of the remote control mode, is required; a camera is enlarged by being provided with the display portion, which may be large, and the indication operation is complicated.

Further, in the normal photographing without doing remote control photographing, the remote control unit is attached to the main body of the camera or to the strap in order not to lose it so that the remote control unit does not function at all in the normal photographing operations. Therefore, although there are two buttons, i.e., the operation button in the remote control unit and the shutter-release button in the main body of the camera, only one of those is used at a time and that is wasteful.

SUMMARY OF THE INVENTION

The objectives of the present invention are to improve the operability in remote control photographing, and to propose a camera which is provided with a remote control unit having solved the above explained various problems. In detail, the objectives of the present invention are to propose a camera in which it is not necessary to set the camera to the remote control mode every time the remote control unit is used, the remote control unit does not disturb an operator when he/she carries the camera, and the operator, who is either right handed or left handed, can easily use the camera.

The above-mentioned objectives are accomplished by a camera characterized to include: a switching means for switching between a suspending status and a photographable status; a remote control unit which includes at least an operation member for photographing operations and a transmitter means for outputting a photographing signal when the operation member is operated; a receiver means for receiving the photographing signal; and a control means for controlling the camera so that the photographing operation is executed always by the reception of the photographing signal with the receiver means when the switching means is switched to the photographable state.

DETAILED DESCRIPTION OF THE INVENTION

An example of the camera having a remote control unit according to the present invention is explained in detail by referring to FIGS. 1 through 14.

Figure 1:
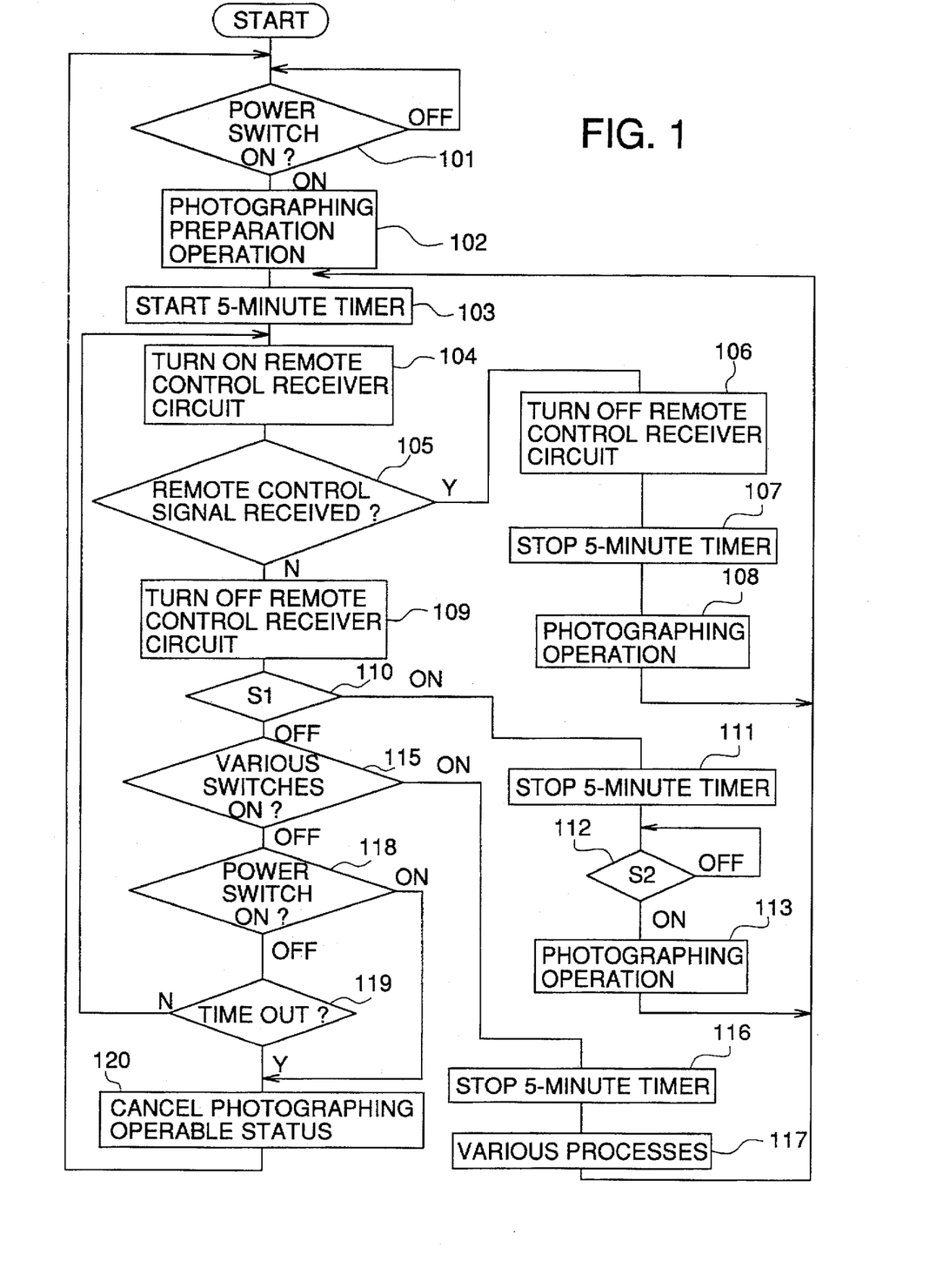
FIG. 1 is a flow chart of the example according to the present invention.

Firstly, the operation of the remote control unit is explained with the flow chart of FIG. 1.

The power switch is turned on (ON of 101) by operating a main switch button or the like, which is provided on the main body of the camera, as the switching means for switching between a suspending status, which does not execute photographing, and a photographable status. When the lens barrel is raised from the sunken position and preparation operations for photographing, such as the charge of a flash light, are completed (102), a timer is automatically started (103) for measuring a predetermined time period such as 5 minutes. It is possible to configure that the predetermined time period is inputted by an operator. The receiver circuit, for receiving a photographing signal which is an optical signal from the remote control unit, is turned on and the receiver circuit is in a receivable status (104). Therefore, the control means in the main body of the camera determines whether or not the photographing signal is received (105); if it is received (Y of 105), the receiver circuit is turned off (106), the measurement of 5 minutes is halted (107), and photographing operations, such as a shutter open/close operation and a film wind operation, are executed (108). After that, the sequence returns to the next step of the preparation operations for photographing (102).

Even when the receiver circuit is in the receivable status, if the photographing signal in not received in a predetermined time period such as 20 μs (N of 105), the receiver circuit is turned off (109). After that, when S1, which is the first step of the shutter-release button, is on (ON of 110), the timer is halted (111), the photographing operations similar to the above are executed (113) by the turn-on operation of S2, which is the second step of the shutter-release button (112), and the sequence is returned to the next step of the preparation operations for photographing (102).

The various switches, for example, a zooming operation and a photographing mode switching operation, are operated (ON of 115) without turning S1 on (OFF of 110), the timer is halted (116), the various operations responsive to the various switch operations are executed (117), and the sequence is returned to the next step of the preparation operations for photographing (102).

When the various switch operations are not done (OFF of 115), the status of the power switch is determined (118); if the power switch is off (OFF of 118), the passage of 5 minutes is determined (119) and the sequence is returned to the next step of the timer start (103) and repeats the aforementioned operations when it has not passed 5 minutes yet. If one cycle of this operation takes 1 ms (1000 μs), the ratio of operational status of the receiver circuit in 5 minutes is 20/1000=1/50. Since the signal from the transmitter circuit is repeatedly transmitted, the receiver circuit surely receives the signal no matter that the signal is transmitted when the receiver circuit is in the Off status because the signal is also transmitted when the receiver circuit is in the ON status.

When 5 minutes have passed (Y of 119), the operations to cancel the photographable status of the camera and to convert it to stand-by status, such as by moving the lens barrel from the raised position to the sunken position, are carried out (120). When the power switch is turned on before 5 minutes have passed, the operations to cancel the photographable status are carried out in the same manner as above (120). Therefore, the consumption of the battery is minimized by canceling the photographable status and being in the stand-by status.

Further, the above explained photographing signal is normally an optical signal; however, sonic or radio signals can alternatively be used.

Figure 2:
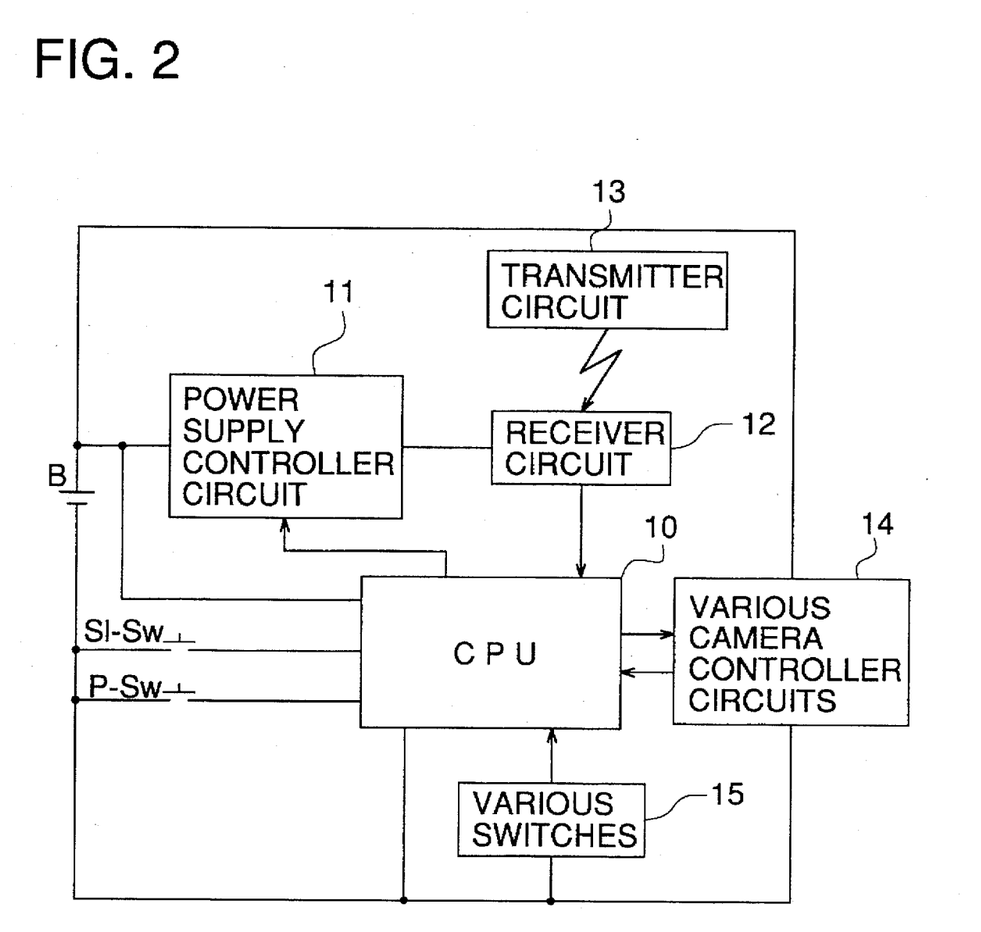
FIG. 2 is a block diagram of a camera for the example according to the present invention.

The block diagram of the camera, which is provided with the remote control unit to operate the above explained flow, is shown in FIG. 2.

When the power switch P-SW of the main body of the camera is turned on, the power supply controller circuit 11, which is connected with the power supply B, turns on the receiver circuit 12, which is a receiving means for receiving the photographing signal, under the operation of the CPU 10, which is a controller means for controlling the entire camera. The photographing signal is transmitted from the transmitter circuit as a transmitting means by the operation of the operating members on the remote control unit. If the receiver circuit 12 in the main body of the camera receives the photographing signal, CPU 10 controls various camera controller circuits 14 so that the operations, such as zooming and shutter releasing, are carried out. The various switches 15, such as the shutter-release switch S1-SW, the mode switch and others, are turned on when the power switch P-SW is turned on and the timer is under operation. The CPU 10 stops the timer and restarts the sequence.

As explained above, in the present invention, the time period that the receiver circuit is on is relatively short; therefore, the consumption of the battery is minimized and, as a result, the remote control mode is not necessary to be especially provided. Therefore, the operation of the remote control unit is always possible after the photographing preparation operation of the camera has been completed, and thereby, the operability of the camera is remarkably improved.

Further, in the conventional models, a display for indicating the set of the remote control mode, is necessary to be provided with the main body of the camera. Even if the indication is simple blinking, a current between 1 and 2 mA is consumed; however, the present invention does not need such an indication and, therefore, the battery consumption is minimized.

Further, the following improvements for minimizing the battery consumption can be applied to the present invention.

In general, the receiver circuit of the main body of the camera is designed to receive the photographing signals from the remote control unit which is apart more than 10 m from the camera. However, in normal photographing, this long distance is not necessary; the receiving distance is set to a practical length around 5 m. When the receivable angle of the receiver circuit is set to the angle of view of the photographing lens and the operation voltage is reduced to 3 V from 5 V, the consumption current of the receiver circuit can be reduced from the value of between 3 and 8 mA to that of between 0.6 and 1 mA.

Figure 3:
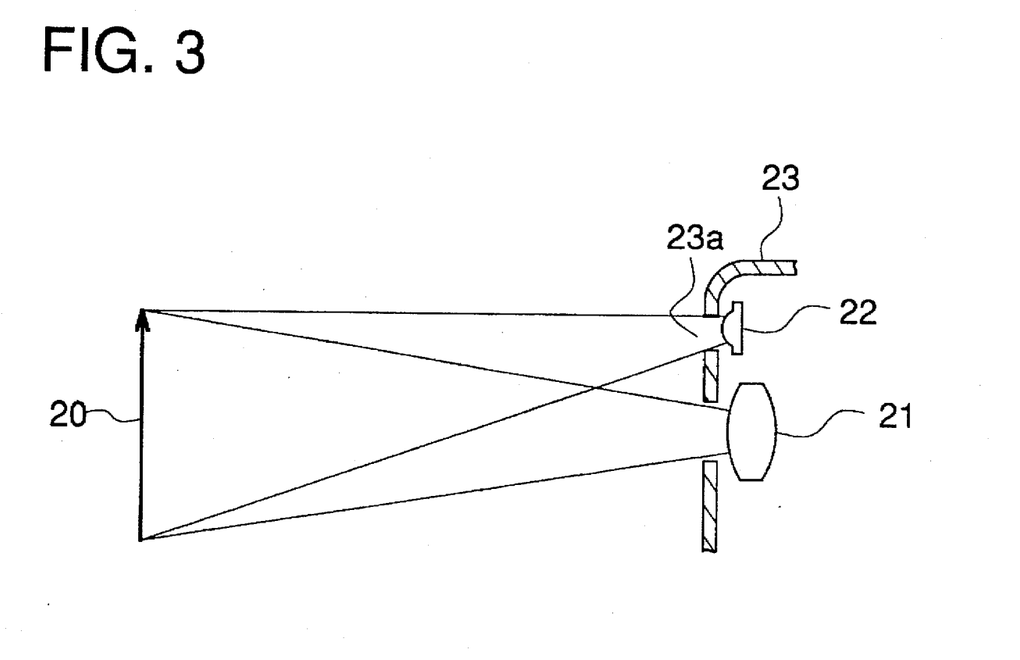
FIG. 3 is a conceptual figure of the camera in which the receiving angle of the photographing signal is set to be that same as the angle of view of the photographing lens.

FIG. 3 is the figure in which the receivable angle of the photographing signal in the receiver circuit is set to relatively the same angle as the angle of view of the photographing lens. 20 represents the object to be photographed, 21 is the photographing lens, and 22 is the photoreceptive element to receive photographing signals. In the same figure, the receivable angle of the photoreceptive element 22 is arranged by the lens and the hole for photoreception 23a of the front cover 23 which are components of the package of the photoreceptive element 22. In one embodiment, the receivable angle of the receiver means for the photographing signal is the same as the angle of view of the photographing lens.

Figure 4:
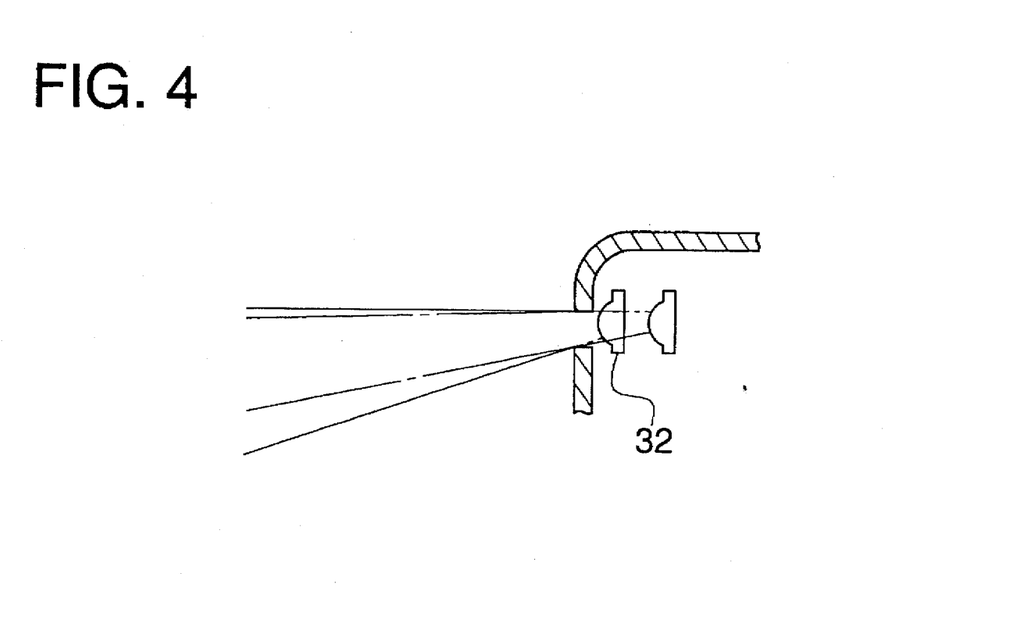
FIG. 4 is a figure indicating a photoreceptor component when a zooming lens is used as the photographing lens.

FIG. 4 is the figure to show the photoreceptive element in which a variable focal length lens, such as a zooming lens, is used as the photographing lens. It is possible to change the receivable angle by moving the photoreceptive element 32 in the optical axis direction in accordance with the change of the angle of view caused by the change of the focal length of the zooming lens, not shown.

Next four examples, in which the remote control unit is attached to the main body of the camera and the remote control unit is operated in the attached condition, are explained. In the normal photographing where remote control photographing is not conducted, conventionally, the remote control unit is attached to the main body of the camera or a strap so as not to operate the remote control unit; however, in the examples, the remote control unit is mainly attached to the main body of the camera, and the normal photographing, in which remote control photographing is not conducted, is also conducted with use of the remote control unit.

[The first example]

Figure 5:
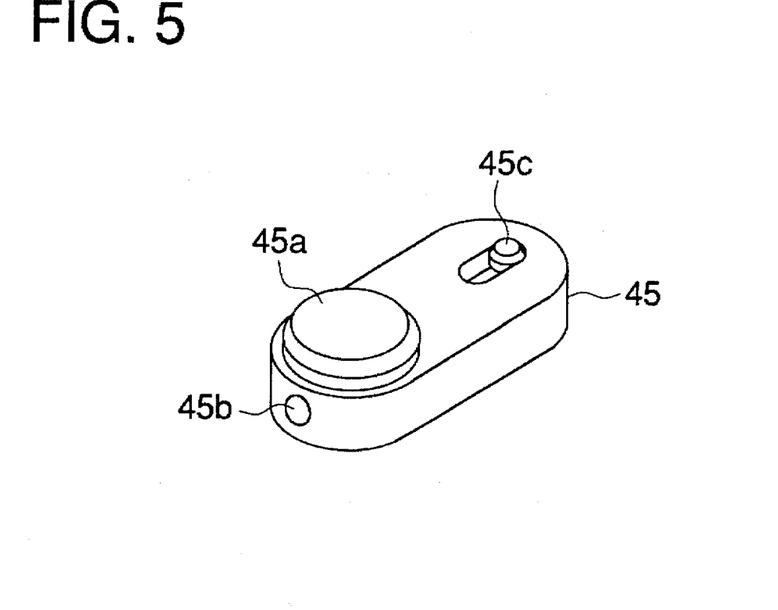
FIG. 5 is a perspective view of a remote control unit according to the first example.
Figure 6:
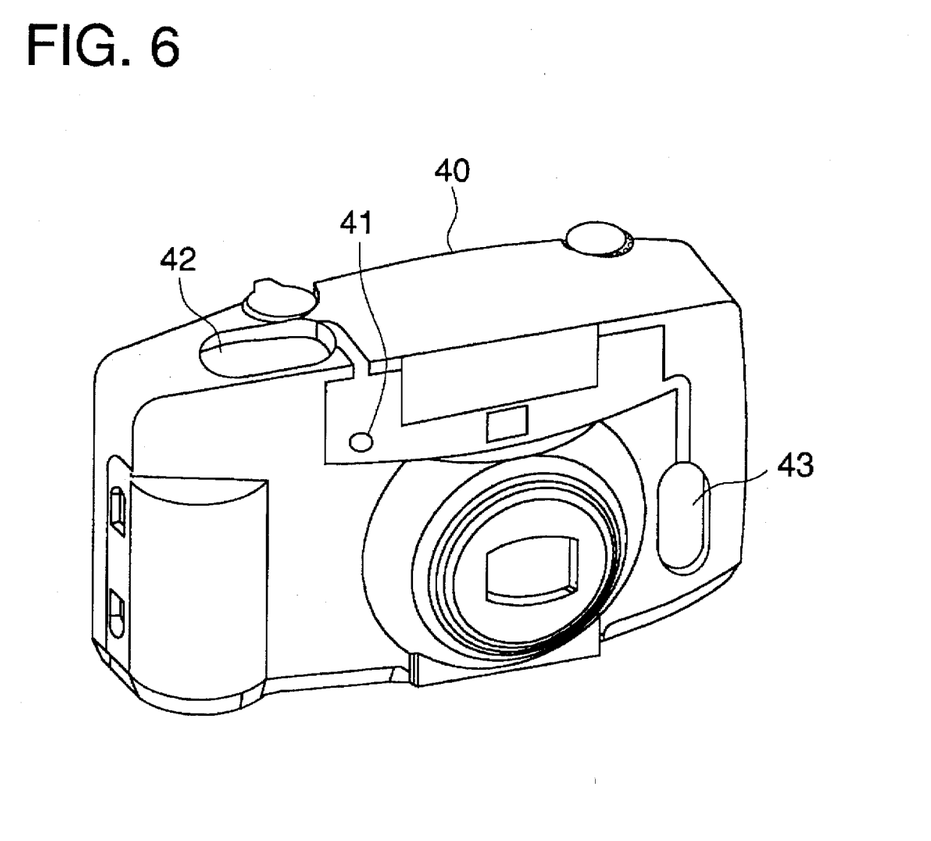
FIG. 6 is a perspective view of the main body of the camera according to the first example without a remote control unit.
Figure 7:
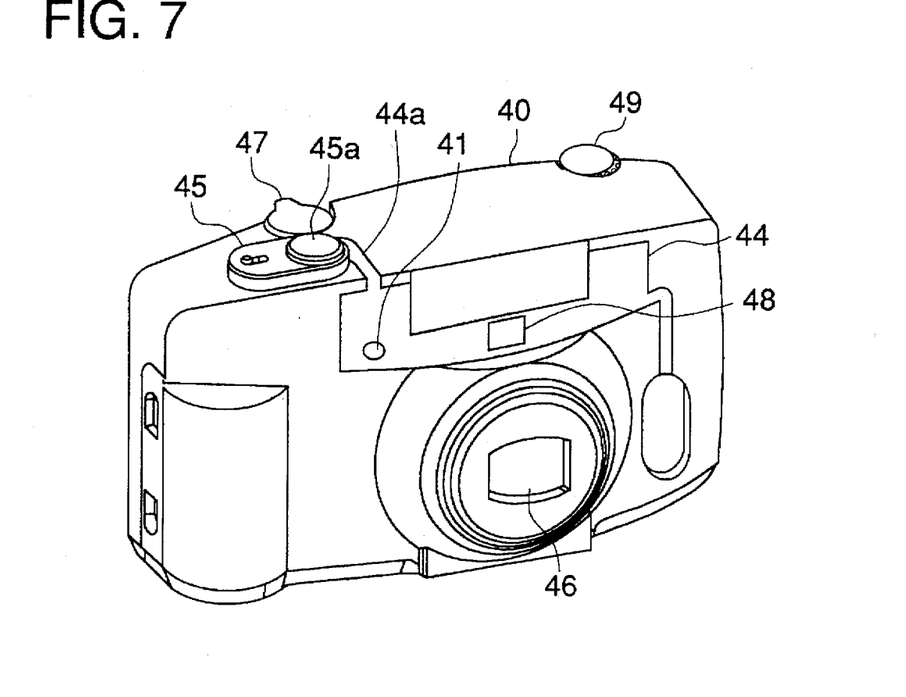
FIG. 7 is a perspective view of the first example wherein a remote control unit is attached onto the upper surface of the main body of the camera.
Figure 8:
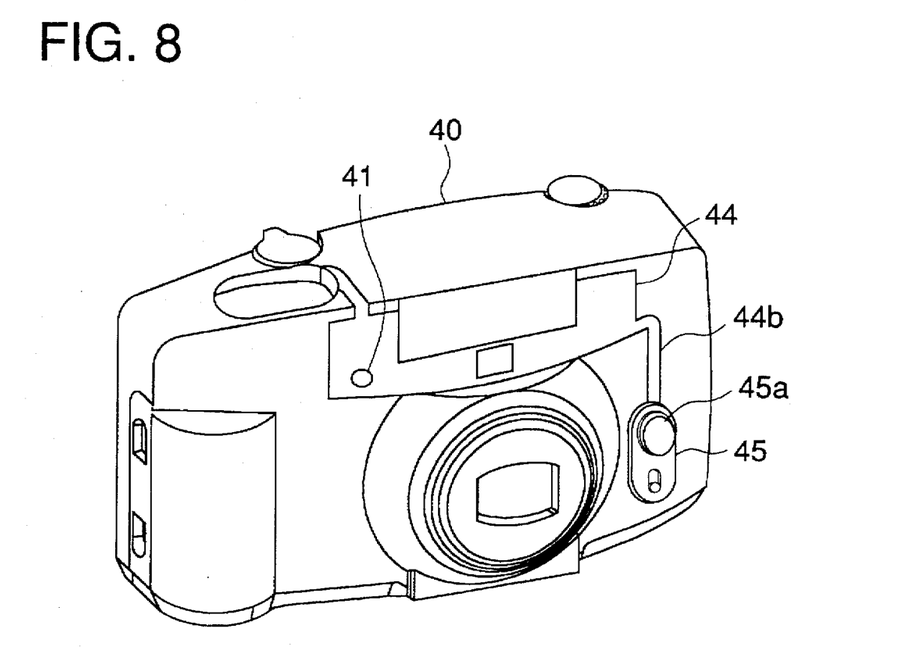
FIG. 8 is a perspective view of the first example wherein a remote control unit is attached onto the front surface of the main body of the camera.

FIG. 5 is a perspective view of the remote control unit. FIG. 6 is a perspective view of the main body of the camera without the remote control unit. FIG. 7 is a perspective view wherein the remote control unit is attached onto the upper surface of the main body of the camera. FIG. 8 is a perspective view wherein the remote control unit is attached onto the front surface of the main body of the camera.

In FIG. 5, the operation button 45a which is an operation section for photographing operations is provided on the remote control unit 45. An optical signal as the photographing signal is transmitted from the transmitter means inside the remote control unit 45 through the transmitter window 45b by pressing the operation button 45a.

Therefore, in remote control photographing, the aforementioned operation is carried out by pointing the remote control unit to the main body 40 of the camera, which is located at the predetermined distance, transmitting the photographing signal, and thereby, receiving the photographing signal through the receiver window 41 of the main body 40 of the camera in FIG. 6.

On the other hand, in the normal photographing, in which remote control photographing is not carried out, the remote control unit 45 is attached onto the indented portion 42 provided on the upper surface or onto the indented portion 43 provided on the front surface both of the main body of the camera. In order to attach the remote control unit 45, the remote control unit 45 is placed on the indented portion 42 or 43, the coupling claw, not shown, is protruded by sliding the attachment button 45c, and the coupling claw is coupled with the coupling portion, not shown, and provided on the indented portions 42 and 43. For the coupling method, various known coupling means are applicable.

Further, regarding the attachment of the remote control unit onto the main body of the camera, it is possible to use a magnetic means instead of the mechanical coupling means. In other words, various known coupling means can be applicable if attachment and detachment of the remote control unit are easy by the means.

Further, if the camera is configured to be covered with a metal of a steel kind and a magnet is fixed with the remote control unit, the remote control unit is capable of freely being coupled with the camera without my limitation of the place.

Instead of the magnet, a loop-and-hook fastener can be used for the purpose.

FIG. 7 is a figure wherein the remote control unit 45 is attached onto the indented portion 42 on the upper surface of the main body 40 of the camera. When the photographic operation is carried out in the attached condition, the photographing signal is outputted to the right had side in the fibre by pressing the operation button 45a of the remote control unit 45 as in the same manner of the shutter-releasing button of a normal camera. The photographing signal is inputted to the upper arm portion 44a of the front panel 44, which is made of an acrylic resin or the like. The photographing signal is further guided to the receiver window 41 by the upper arm portion 44a as an optical guide so that the main body 40 of the camera functions in the same manner as in the remote control photographing.

Here, 46 is the photographing lens, 47 is the main switch, 48 is the finder window and 49 is the photographing mode switch.

FIG. 8 is a figure wherein the remote control unit 45 is attached onto the indented portion 43 on the front surface of the main body 40 of the camera. When the photographic operation is carried out in the attached condition, the photographing signal is outputted to the upper side in the figure, the same as the above, by pressing the operation button 45a of the remote control unit 45. The photographing signal is inputted to the front arm portion 44b of the front panel 44 and guided to the receiver window 41 by the front arm portion 44b as an optical guide.

Further, the configuration of FIG. 8 is suitable for a left handed operator; however, it is obvious that the configuration can be freely arranged without limitation of that of FIG. 8 so that the remote control unit 45 is attached to the preferable position on the main body 40 of the camera. Consequently, the position of shutter-releasing can be suitable not only for left handed use but also for the photographing operation in a vertical position.

Further, it is possible to make more than three locations for attaching the remote control unit 45 on the camera.

By the above explained configurations, the shutter-releasing button on the main body of the camera can be eliminated and the cost of the camera can be reduced.

[The second example]

Figure 9:
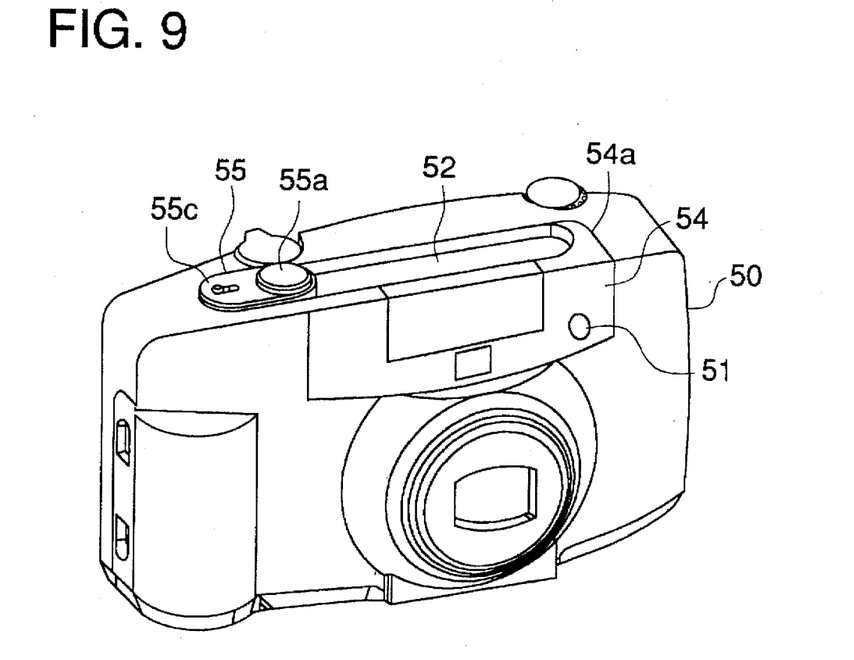
FIG. 9 is a perspective view of the second example wherein a remote control unit is attached onto the upper surface of the main body of the camera.
Figure 10:
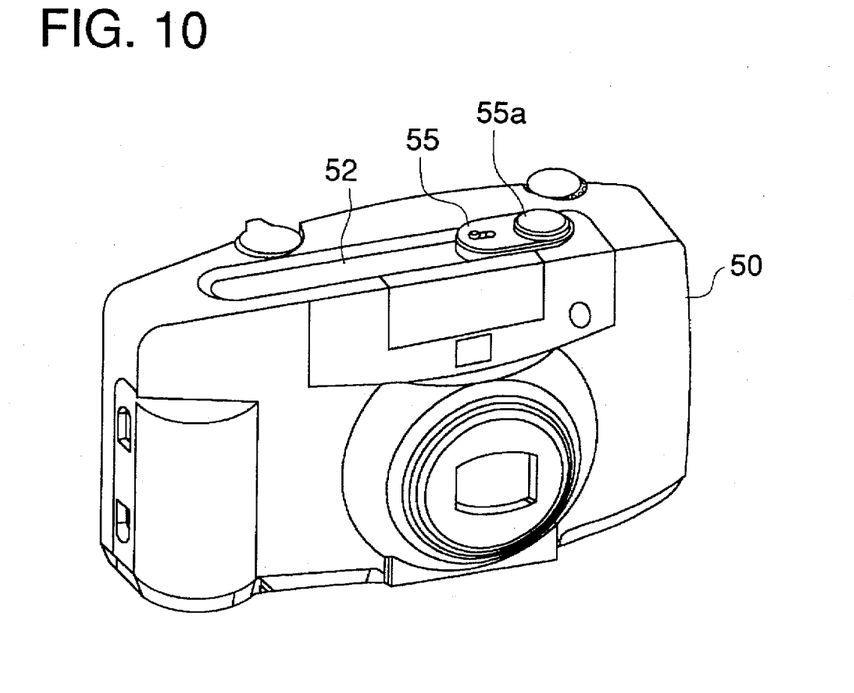
FIG. 10 is a perspective view of the second example wherein a remote control unit is attached onto the upper surface of the main body of the camera.
Figure 11:
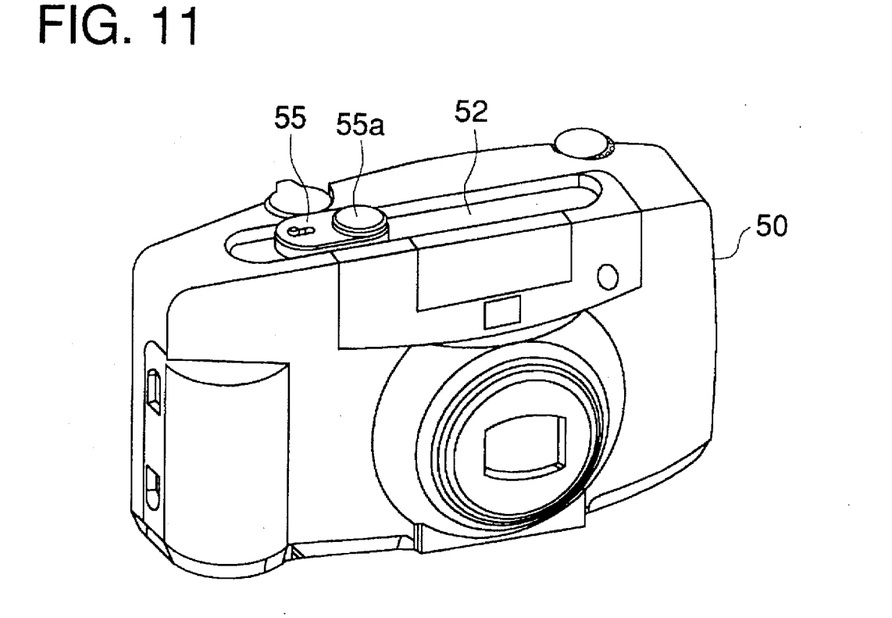
FIG. 11 is a perspective view of the second example wherein a remote control unit is attached onto the upper surface of the main body of the camera.

FIGS. 9 through 11 are the figures wherein the remote control unit is attached onto the upper surface of the main body of the camera.

In this example, the remote control unit 55 is slidably attached on the longitudinal groove 52 of the main body 50 of the camera as a guiding path. In the normal photographing situation, the remote control unit 55 is attached to the left side in the front view as shown in FIG. 9. Accordingly, by pressing the operation button 55a, the photographing signal is outputted to the right side in the figure. The photographing signal is inputted to the upper arm portion 54a of the front panel 54 and guided to the receiver window 51 by the upper arm portion 54a as an optical guide.

FIG. 10 is the figure wherein the remote control unit 55 is attached to the right side of the longitudinal groove 52 in the front view. The photographing operation in this condition is the same as that in the above; however, this condition is suitable for a left handed operator.

FIG. 11 is the figure wherein the remote control unit 55 is attached to the position shifted from the left side to the center of the longitudinal groove 52 in the front view. The photographing operation in the condition is the same as that in this above; however, this condition is suitable for a right handed operator who has relatively long fingers.

Attachment/detachment of the remote control unit onto/from the main body of the camera is conducted by, the same as that in the above, the operation of the attachment button 55c.

Accordingly, in the present example, the remote control unit 55, in other words the operation button 55a, can be moved to a preferable position; therefore, the position of shutter-releasing can be set to the most suitable position for a right handed or left handed operator, an operator having long fingers or short fingers, and an operator having a habit to press the button. Consequently, the shutter-releasing button of the main body of the camera can be eliminated, holding condition is improved, and the picture by the camera is prevented from being blurred. Further, the operation of focal-setting can be easier.

[The third example]

Figure 12:
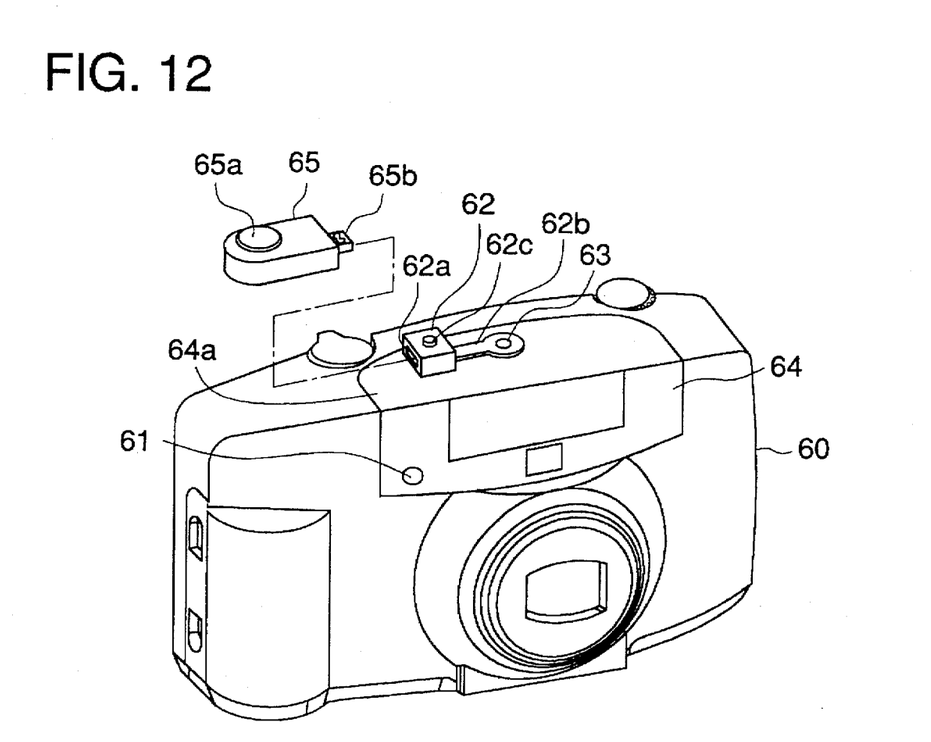
FIG. 12 is a perspective view of the third example wherein a remote control unit is attached onto the upper surface of the main body of the camera.

FIG. 12 is the figure wherein the remote control unit is set on the upper surface of the main body of the camera. In this example, the remote control unit 65 has the coupling portion 65b and the remote control unit 65 is held by the holding portion 62 in which the coupling portion 65b is inserted into the coupling hole 62a of the holding portion 62 which is provided on the main body 60 of the camera. The remote control unit 65 of the present example is configured so that the photographing signal is outputted downwardly in the figure by pressing the operation button 65a; therefore, the photographing signal is guided to the receiver window 61 by the upper portion 64a of the front panel 64 as an optical guide.

Further, the holding portion 62 is held by the arm portion 62b and the arm portion 62b is rotatably supported by the shaft 63. Therefore, by rotating the holding portion 62 on the shaft 63 as an axis, the remote control unit 65, being attached to the camera, is moved to the location opposite in the longitudinal direction of the main body 60 of the camera so as to be at the suitable operating position for a left handed operator.

In order to detach the remote control unit 65 from the holding portion 62, the button 62c is pushed.

[The fourth example]

Figure 13:
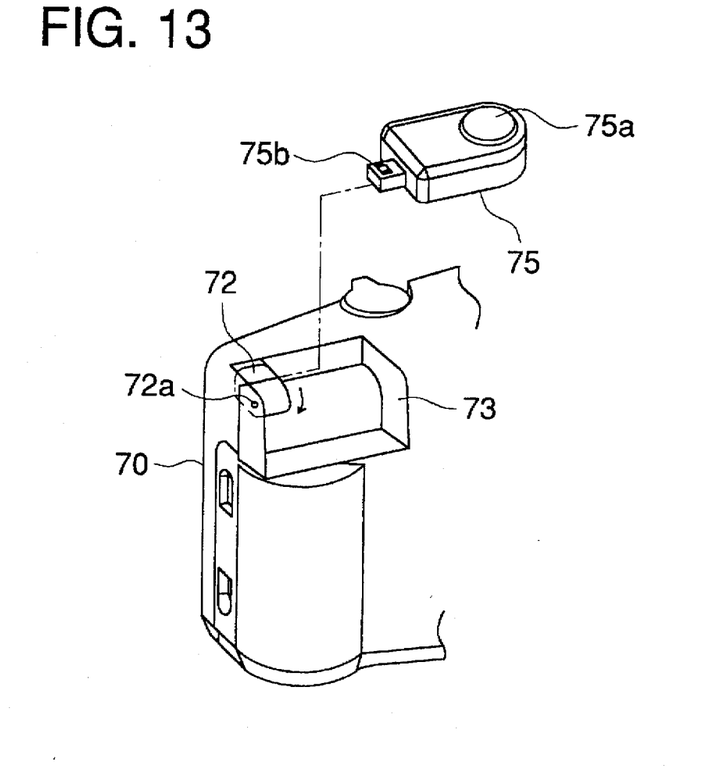
FIG. 13 is a perspective view of the fourth example at the left side of the main body of the camera wherein a remote control unit is attached to the camera so as to face the operation button thereof upward.

FIG. 13 is the figure of the left side of the main body of the camera wherein the remote control unit is attached so as to face the operation button upward.

The main body 70 of the camera is provided with the holding portion 72 which is rotatable for 270 degrees. The remote control unit 75 is attached to the main body 70 of camera by inserting the coupling portion 75b of the remote control unit 75 into the holding portion 72 as shown by a dotted line. When the remote control unit 75 is attached in the condition shown in FIG. 13, the operation button 75a is faced upward. If the operation button 75a is pushed in this condition, the photographing signal is outputted toward the right side in the figure and guided to the receiver window by being inputted to the transparent wall portion 73 which is connected to the receiver window, not shown in the figure.

Figure 14:
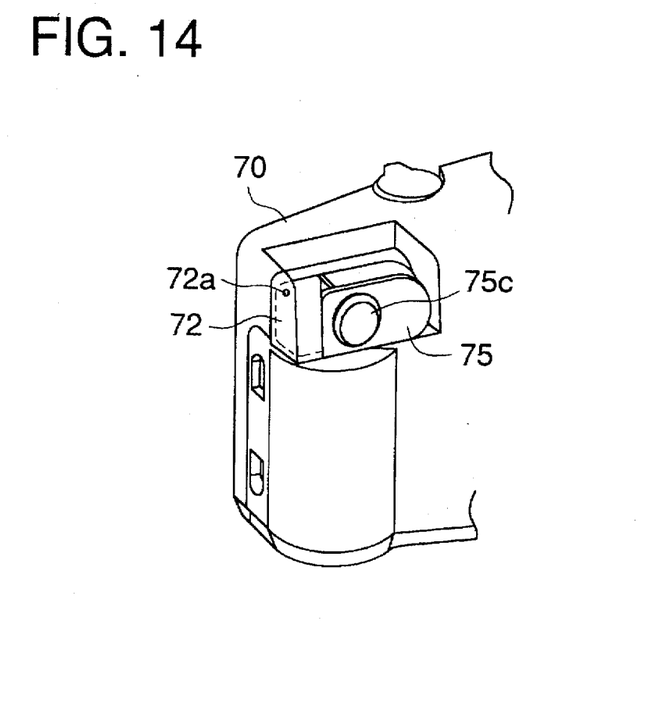
FIG. 14 is a perspective view of the fourth example at the left side of the main body of the camera wherein a remote control unit is attached to the camera so as to face the operation button thereof to the front.

Next, in the case wherein the operation button 75a can be more stably pushed at the front side instead of the upper side such as in photographing of a vertical operation, the remote control unit 75 is rotated 270 degrees in the arrowed direction with the holding portion 72 so as to be as shown in FIG. 14. Since the holding portion 72, to which the remote control unit 75 is attached, is held by the shaft 72a, which is located at an upper front position of the main body 70 of the camera, the remote control unit 75 is flipped over when the remote control unit is rotated 270 degrees. Consequently, another operation button 75c, which is located on the rear side of the remote control unit 75, appears and is operable to be pushed when the operation button is operated at the front of the camera.

Obviously, in the above-mentioned four examples of the remote control unit, it is possible to provide on the remote control unit a setting portion for setting the various photographing modes under the remote control operation and a display portion on the remote control unit for displaying their mode indications. For the examples of the photographing modes, there may be the mode that the shutter-release is conducted immediately by the operation of the operation button, the mode that the shutter-release is conducted 3 seconds after the operation of the operation button, the mode that one shutter-release is conducted by one operation of the operation button, and the mode that two shutter-releases are conducted by one operation of the operation button. Further, it is possible to be configured that the battery condition of the remote control unit is confirmed with the display portion.

According to the camera of the present invention, the operability of the camera is remarkably improved since it is not necessary to set the camera to a remote control mode as in the conventional cameras, and the camera can be set in a receivable condition of the photographing signal by simply switching to the photographable status. Further, even in the remote control mode, which is less frequently used than the normal mode, photographing mistakes, caused by not setting to the remote control mode, can be prevented. Still further, there is no independent remote control mode, all the selectable modes are of the conventional normal photographing modes; the mode setting operation is the same as that of a conventional camera but both remote control photographing and normal photographing can be easily carried out.

Further, the camera can be handy and prevented from losing the remote control unit since it is attached to the main body of the camera when the remote control unit is not used.

It is possible to minimize the configuration and the cost by eliminating the shutter-releasing button, whose function is the same as that of the operation member of the remote control unit, on the main body of the camera.

Not only is the remote control mode canceled a predetermined time period after the operation as in a conventional camera, but also the photographable condition of the camera is canceled; therefore, the battery consumption is minimized. Further, in the camera which is capable of changing its shape between the suspending condition and the photographable condition such as the one capable of sinking the lens barrel, an operator can easily determine whether or not the operation by the remote control unit can be conducted from the position apart from the camera.

There is no danger that the battery consumption is increased when the photographing signal is always receivable.

Since the receivable angle is set to relatively the same as the angle of view of the photographing lens, the problem of the conventional camera, which has a wider receivable angle than the angle of view of the photographing lens, wherein the photographer may not be photographed when the photographing signal is received by the camera is relieved.

The position of shutter-releasing can be set to the most suitable position for horizontal or vertical position photographing, a right handed or left handed operator, an operator having long or short fingers, or an operator having a habit to press the button all by moving the remote control unit; therefore, the holding condition is improved and the picture taken by the camera is prevented from being blurred. Further, the operation of focal-setting can be easier.

In remote control photographing, the photographing mode can be confirmed at the place where the operator is.

What is claimed is:

1. A camera, comprising:
   a switching means for switching said camera between a suspending status and a photographable status;
   a remote control unit attachable and detachable from said camera, said remote control including;
      an operation member for conducting a photographing operation located on said remote control unit, said remote control unit further comprising
      a single transmitter means for outputting a single photographing signal when said operation member is operated;
   a receiver means for receiving said photographing signal from said remote control unit; and
   a control means for controlling said camera so that a photographing operation of said camera is only conducted when said single transmitter means outputs said single photographing signal to said receiver means and only when said switching means is switched to said photographable status.

2. A camera, comprising:
   a switching means for switching said camera between a suspending status and a photographable status;
   a remote control unit, including;
      an operation member for conducting a photographing operation; and
      a transmitter means for outputting a photographing signal when said operation member is operated;
   a receiver means for receiving said photographing signal; and
   a control means for controlling said camera so that a photographing operation is always conducted in accordance with a receipt of said photographing signal with said receiver means when said switching means is switched to said photographable status;
   said control means providing alternatively a receivable time period when said receiver means is available for receiving said photographing signal and non-receivable time period when said receiver means is not available for receiving said photographing signal, both said receivable time period and said non-receivable time period being within a predetermined time period.

3. The camera of claim 2, wherein said remote control unit is attachable onto a main body of said camera and said remote control unit is detachable from said main body of said camera.

4. The camera of claim 2, said photographing operation is conducted only by an operation of said operation member.

5. The camera of claim 2, wherein said control means controls said camera so that said switching means is switched from said photographable status to said suspending status when said switching means is switched to said photographable status and said receiver means does not receive said photographing signal within said predetermined time period.

6. The camera of claim 2, wherein said receivable time period is shorter than said non-receivable time period.

7. The camera of claim 2, further comprising:
   a holding portion, provided on said main body of said camera, for holding said remote control unit wherein said holding portion is rotatable.

8. A camera, comprising:
   a switching means for switching said camera between a suspending status and a photographable status;
   a remote control unit, including;
      an operation member for conducting a photographing operation; and
      a transmitter means for outputting a photographing signal when said operation member is operated;
   a receiver means for receiving photographing signal; and
   a control means for controlling said camera so that a photographing operation is always conducted in accordance with a receipt of said photographing signal with said receiver means when said switching means is switched to said photographable status; wherein said remote control unit is attachable onto a main body of said camera and said remote control unit is detachable from said main body of said camera; wherein said camera is capable of holding said remote control unit at one of a plurality of positions on said main body of said camera.

9. A camera, comprising:
   a switching means for switching said camera between a suspending status and a photographable status;
   a remote control unit, including:
      an operation member for conducting a photographing operation; and
      a transmitter means for outputting a photographing signal when said operation member is operated;
   a receiver means for receiving said photographing signal; and
   a control means for controlling said camera so that a photographing operation is always conducted in accordance with a receipt of said photographing signal with said receiver means when said switching means is switched to said photographable status;
   wherein said remote control unit is attachable onto a main body of said camera and said remote control unit is detachable from said main body of said camera;
   said camera is capable of slidably holding said remote control unit along a guide path, formed on said main body of said camera, so that said remote control unit is capable of being held at a preferable position in said guide path.

* * * * *